C. HOLMBLADE.
ENGINE TRUCK.
APPLICATION FILED JAN. 18, 1916.
1,188,176.
Patented June 20, 1916.
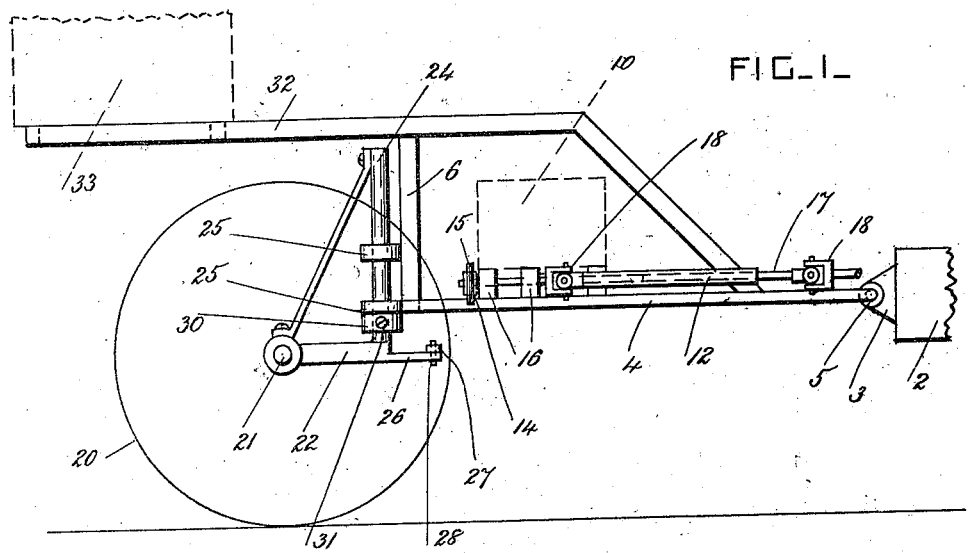
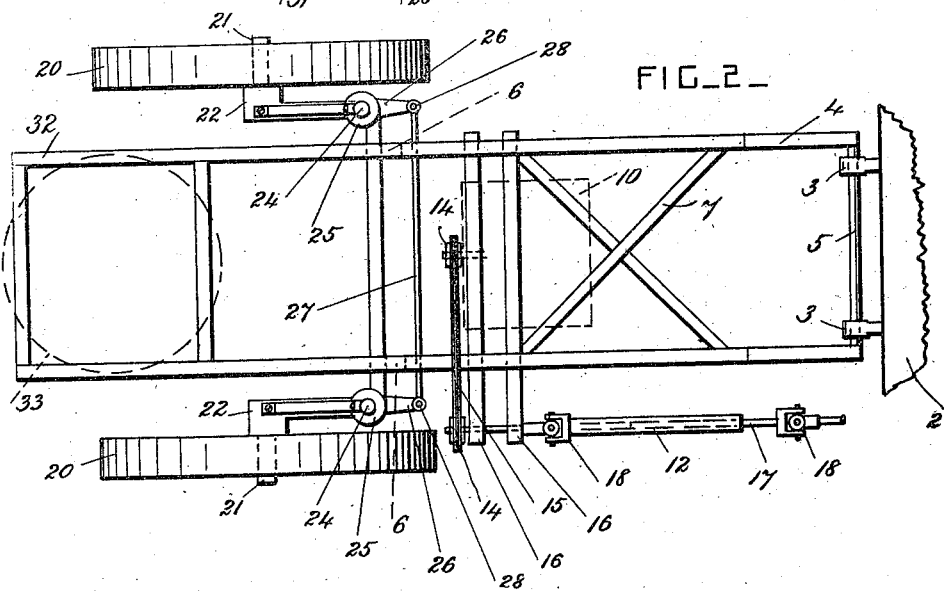
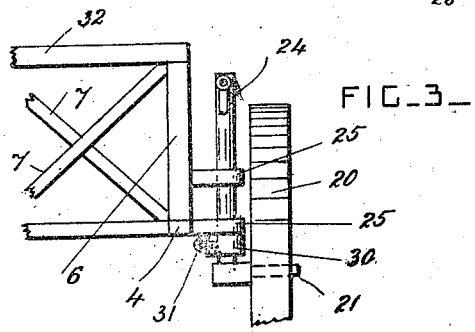
Inventor
Carl Holmblade
by Herbert W. T. Jenner
Attorney

UNITED STATES PATENT OFFICE.

CARL HOLMBLADE, OF GRACEVILLE, MINNESOTA.

ENGINE-TRUCK.

1,188,176. Specification of Letters Patent. Patented June 20, 1916.

Application filed January 18, 1916. Serial No. 72,782.

*To all whom it may concern:*

Be it known that I, CARL HOLMBLADE, a citizen of the United States, residing at Graceville, in the county of Bigstone and State of Minnesota, have invented certain new and useful Improvements in Engine-Trucks; and I do hereby declare the following to be a full, clear, and exact description of the invention, such as will enable others skilled in the art to which it appertains to make and use the same.

This invention relates to a truck or cart adapted to be connected to the frame of a grain harvester and binder of any approved construction for the purpose of supporting an internal combustion engine and its cooling tank independently of the ground wheels of the grain harvester and binder, thereby enabling the machine to be used to better advantage on soft ground.

This invention consists in the novel construction and combination of the parts forming the truck or cart and as hereinafter fully described and claimed.

In the drawings, Figure 1 is a side view of a truck constructed according to this invention. Fig. 2 is a plan view of the same. Fig. 3 is an end view of a portion of the truck showing the connection of an adjustable frame section with the main frame.

The grain harvester and binder, or other similar agricultural implement, is of any approved construction, and 2 is a portion of its frame which is provided with lugs 3 for the attachment of the truck. The truck has a main frame 4 the front end portion or draft bar 5 of which is pivoted in the lugs 3, but the truck may be pivoted to the frame 2 in any other convenient way.

The main frame 4 is formed in any approved way, and it has vertical uprights 6 at its rear end which are connected together and to its various frame members by any suitable braces 7 which will make a rigid structure.

The internal combustion engine, indicated by dotted lines 10, is placed on the rear part of the main frame 4, which forms a supporting platform for it.

The internal combustion engine is operatively connected with the mechanism of the grain harvester in any convenient way which will permit the main frame 4 to move pivotally. In the arrangement shown, the engine is connected to a countershaft 12 by sprocket wheels 14 and a drive chain 15, and the countershaft 12 is journaled in bearings 16 on the frame 4. The countershaft 12 has a telescopic extension 17 and universal joints or couplings 18 for connecting it with one of the shafts of the harvester, and these parts afford the necessary flexibility of connection.

The main frame 4 is supported by ground wheels 20 which are journaled on spindles 21 which project from adjustable pivoted frames 22. The frames 22 have vertical members 24 which are pivoted in bearings 25 which project laterally from the vertical uprights 6 of the main frame.

The axle spindles 21 are arranged to the rear of the pivot members 24, and arms 26 project forwardly of said members. A coupling-rod 27 extends crosswise of the truck and is pivoted to the arms 26 by pins 28. The lower bearings 25 rest on collars 30 which are adjustable upon the vertical pivot members 24, and which are provided with set-screws 31, or similar fastenings, for securing them in place. These collars 30 are set so that the engine platform is horizontal, and so that the countershaft 12 can be coupled up to the mechanism of the harvester to the best advantage.

An auxiliary frame 32 is provided and is secured to the tops of the uprights 6, and is held rigid by suitable braces. A cooling tank 33 is supported by the frame 32, and this frame is arranged above the level of the engine, and to the rear of the axle spindles, so that the front end of the main frame 4 and the harvester frame are relieved to a great extent of the weight of the cooling tank and of the engine and its truck, the ground wheels being provided to take the weight of these parts and having broad faces so that they may run over soft ground without sinking into it. The pivotal connection of the frames 22 with the main frame 4 permits the truck to follow all the movements of the harvester, and to turn around with it, and the auxiliary frame or platform 32 is arranged above the level of the ground wheels so that they can turn under it.

What I claim is:

1. A truck comprising a main platform having a draft connection at its front end and vertical posts at its rear end, axle frames provided with laterally projecting spindles and pivoted to the said vertical posts so as to rock in a horizontal plane, ground wheels mounted on the said spindles and projecting rearwardly beyond the end and above the top of the said main platform, and an auxiliary platform arranged substantially parallel to the said main platform and supported by the said vertical posts above the said wheels and to the rear of the said main platform and having its front portion braced to the front portion of the main platform.

2. A truck comprising a main frame provided with a pivot draft connection at its front end and having vertical uprights at its rear part, frames provided with axle spindles and having vertical pivot members, bearings projecting from the said uprights and engaging with the pivot members, adjustable collars for supporting the said bearings on the pivot members, ground wheels mounted on the axle spindles, and an auxiliary frame secured to the upper parts of the said uprights above the ground wheels.

In testimony whereof I have affixed my signature.

CARL HOLMBLADE.